(12) United States Patent
Berry et al.

(10) Patent No.: US 11,401,684 B2
(45) Date of Patent: Aug. 2, 2022

(54) PERCEPTION-BASED ALIGNMENT SYSTEM AND METHOD FOR A LOADING MACHINE

(71) Applicant: Caterpillar Inc., Peoria, IL (US)

(72) Inventors: Jeffrey K. Berry, Yorkville, IL (US); Michael A. Spielman, Brookfield, IL (US)

(73) Assignee: Caterpillar Inc., Peoria, IL (US)

( * ) Notice: Subject to any disclaimer, the term of this patent is extended or adjusted under 35 U.S.C. 154(b) by 204 days.

(21) Appl. No.: 16/836,097

(22) Filed: Mar. 31, 2020

(65) Prior Publication Data

US 2021/0301494 A1     Sep. 30, 2021

(51) Int. Cl.
| | |
|---|---|
| *E02F 3/43* | (2006.01) |
| *E02F 9/26* | (2006.01) |
| *G05D 1/02* | (2020.01) |
| *E02F 9/20* | (2006.01) |

(52) U.S. Cl.
CPC ............ *E02F 3/434* (2013.01); *E02F 9/205* (2013.01); *E02F 9/2045* (2013.01); *E02F 9/262* (2013.01); *G05D 1/0234* (2013.01); *G05D 2201/0202* (2013.01)

(58) Field of Classification Search
CPC ......... E02F 3/434; E02F 9/2045; E02F 9/205; E02F 9/262; G05D 1/0234; G05D 2201/0202
See application file for complete search history.

(56) References Cited

U.S. PATENT DOCUMENTS

| | | | |
|---|---|---|---|
| 6,247,538 B1 | 6/2001 | Takeda et al. | |
| 8,626,541 B2 | 1/2014 | Doan et al. | |
| 9,131,119 B2 | 9/2015 | Friend et al. | |
| 9,598,836 B2 | 3/2017 | Hargrave, Jr. et al. | |
| 9,714,497 B2 | 7/2017 | Hague | |
| 10,106,951 B2 | 10/2018 | Myers | |
| 10,289,112 B2 * | 5/2019 | Samaraweera | G01C 21/00 |
| 2012/0180424 A1 * | 7/2012 | Hinshaw | E04B 1/26 |
| | | | 700/95 |
| 2014/0146167 A1 | 5/2014 | Friend et al. | |
| 2015/0168136 A1 | 6/2015 | Kamat et al. | |
| 2016/0292920 A1 * | 10/2016 | Sprock | G06T 13/20 |
| 2021/0148086 A1 * | 5/2021 | Ready-Campbell | |
| | | | G05D 1/0223 |

(Continued)

FOREIGN PATENT DOCUMENTS

| | | | | |
|---|---|---|---|---|
| AU | 2014201261 A1 * | 10/2014 | | B60L 3/0015 |
| EP | 3412838 | 12/2018 | | |
| JP | 06019547 | 1/1994 | | |

(Continued)

*Primary Examiner* — Tyler J Lee
(74) *Attorney, Agent, or Firm* — Leydig, Voit & Mayer, Ltd.

(57) ABSTRACT

A perception-based alignment system can assist in aligning a loading machine with a material receptacle. The perception-based alignment system can be associated with a visual sensor network that can capture an image of the material receptacle. A fiducial marker is associated with the material receptacle. In an aspect, the perception-based alignment system can record an alignment data record of a loading operation and associate the alignment data record with the fiducial marker and, in another aspect, the perception-based alignment system can retrieve and execute the alignment data record to assist with a subsequent loading operation.

20 Claims, 6 Drawing Sheets

(56) References Cited

U.S. PATENT DOCUMENTS

2021/0149391 A1* 5/2021 Ready-Campbell .... E02F 3/434
2021/0149403 A1* 5/2021 Ready-Campbell ........................
G05D 1/0027

FOREIGN PATENT DOCUMENTS

KR     20130071184     6/2013
WO      2013191017    12/2013

* cited by examiner

| Relative Proximity | Implement Settings | |
|---|---|---|
| | Lift Actuator 184 | Tilt Actuator 192 |
| | | |
| | | |
| | | |
| | | |

FIG. 6

PERCEPTION-BASED ALIGNMENT SYSTEM AND METHOD FOR A LOADING MACHINE

TECHNICAL FIELD

This patent disclosure relates generally to a loading machine for loading material to a material receptacle and, more particularly, to a perception-based system to assist in aligning the loading machine relative to the material receptacle.

BACKGROUND

Loading machines are commonly used at worksites such as mines, quarries, and construction sites to move materials to different locations within and/or away from the worksite. Examples of loading machines include bucket loaders, excavators, and/or mobile cranes. Loading machines typically include a bucket for accommodating the material that is coupled to a lifting implement such as a mechanical linkage that is movable through various positions and spatial configurations. An operator of the loading machine can control various input devices to conduct a sequence of operations to maneuver the bucket and lifting implement and complete an operation. One common task for a loading machine is to load the bucket with material, lift the material with respect to the ground or work surface, transport the material about the worksite, and unload or dump the material to a material receptacle such as a haul truck or into the hopper of material processing equipment.

Approaching and aligning the loading machine with respect to the material receptacle is a complex task that may require significant experience because efficient execution may require the loading machine to simultaneously perform several distinct steps and sub-operations. In addition, in a mining environment, the large sizes and forces associated with the loading machines and material receptacles often means that errors or mistakes can lead to significant damage to the equipment. In addition, in recent years, there have been efforts and proposals to partially or fully automate aspects of the material handling operation through application of computers, sensors, and control systems to assist in operation of the loading machines and similar material handling machines.

U.S. Pat. No. 9,131,119 ("the '119 patent"), assigned to the assignee of the present application, describes a perception-based system for assisting in material loading operations. The '119 patent describes using visually perceptive symbols and markers, referred to as fiducials, located about the worksite, including on various machines. A spatial perception system including or utilizing devices such as smart cameras or LIDAR can visually detect the fiducials and can process measurements made with respect to proximity and alignment relative to the fiducials to assist in maneuvering the material handling machines, including during loading and dumping operations. The '119 patent broadly describes implementations and benefits of using perception-based systems to assist in material handling operations; and the present disclosure is directed to novel improvements on a perception-based system for a loading machine.

SUMMARY

The disclosure describes, in one aspect, a perception-based alignment system for aligning a loading machine with a material receptacle. The loading machine can include an operator input device configured to manually align and position the loading machine relative to the material receptacle and to operate a lift implement and a bucket associated with the loading machine to load the material receptacle. A recording system is associated with the lift actuator and the tilt actuator to record an alignment data record of operational settings of the lift and tilt actuators while manually conducting a loading operation. The recording system can include a data storage to store the alignment data record. A visual sensor network can be configured to image a fiducial marker associated with the material receptacle. The perception-based alignment system may include an electronic controller that communicates with the visual sensor network and the recording system. The electronic controller is programmed to associate the alignment data record with the fiducial marker on the material receptacle; retrieve the alignment data record from the data storage upon imaging of the fiducial marker; and to align and position the loading machine relative to the material receptacle in accordance with the alignment data record.

In another aspect, the disclosure describes a method of aligning a loading machine relative to a material receptacle. In accordance with the method, an alignment data record is recorded and stored of the operational settings for a lift actuator associated with a lift implement and a tilt actuator associated with a bucket while manually aligning and positioning the loading machine relative to the material receptacle. In addition, a fiducial marker associated with a material receptacle is imaged and used to associate the material receptacle with the alignment data record. Upon another imaging of the fiducial marker, the alignment data record is retrieved and used to align and position the loading machine relative to the material receptacle.

In yet another aspect, the disclosure describes a loading machine having a frame disposed on a plurality of traction devices. To propel the traction devices, the loading machine can include a power source coupled to the traction devices to propel the loading machine. The loading machine can include a visual sensor network with one or more image sensors to capture an image of a fiducial marker associated with a material receptacle. The loading machine may also include a recording system to record an alignment data record made while manually aligning and positioning the loading machine relative to the material receptacle and store the alignment data record in a data storage. An electronic controller on the loading machine is programmed with a perception-based alignment system configured to associate the fiducial marker with the alignment data record; retrieve the alignment data record from the data storage upon another imaging of the fiducial marker; and align and position the loading machine relative to the material receptacle in accordance with the alignment data record.

DETAILED DESCRIPTION

Figure 1:
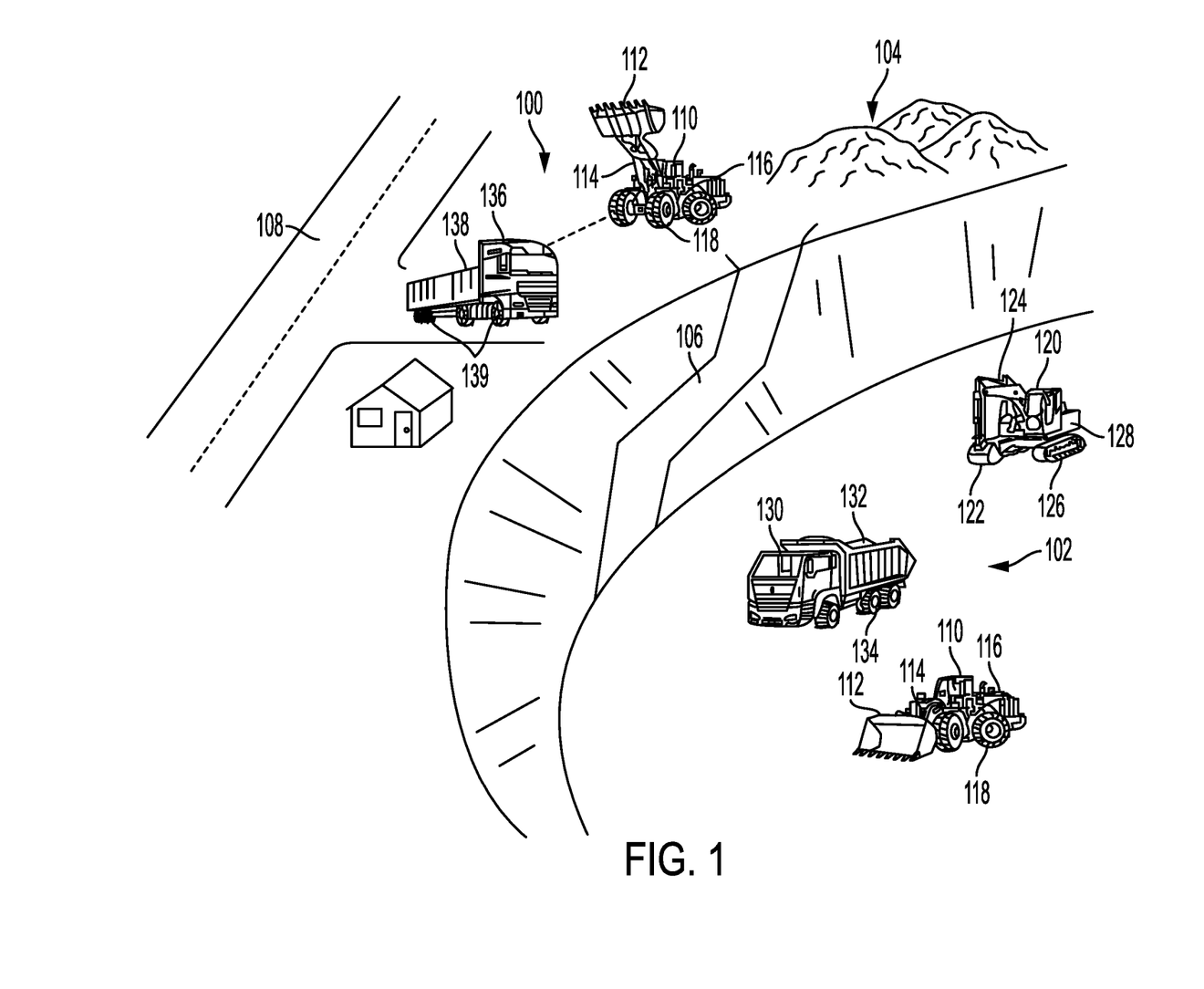
FIG. 1 is a schematic illustration of a material production worksite such as a mine or quarry including a plurality of loading machines and hauling machines for performing various material handling tasks.

Now referring to the drawings, wherein whenever possible like reference numbers will refer to like elements, there is illustrated in FIG. 1 a worksite 100 such as a mine or a quarry for extraction, processing, storing, and delivery of mined material such as coal, ore, minerals, construction aggregate, and the like. However, aspects of the disclosure may be applicable to other types of worksites 100 including construction sites, agricultural sites, and the like. Various different operations, tasks, and processes may be conducted at different locations and at different stages in the worksite 100. By way of example, to obtain the raw materials, the worksite 100 may be associated with one or more mines 102, which are the physical locations where the raw materials are excavated from the ground. The mine 102 may be a surface mine in which the overburden (vegetation, dirt, and the like) is stripped away and removed to access the raw materials underneath. The raw materials may be separated from the ground by drilling, hammering, or blasting operations and removed from the mine 102. In other examples, the mine 102 may be a subsurface or underground mine in which tunnels are dug into the earth to access the raw materials.

The material obtained from the mine 102 can be temporarily stored in various storage piles 104 disposed about the worksite 100 for further processing or until they have been sold and their transportation away from the worksite 100 occurs. To connectively link the mine 102, storage piles 104, and other aspects of the worksite 100, a plurality of unpaved paths 106 or tracks can be laid about and demarcated about the worksite 100 to avoid hazards and the like. To dispatch materials from the worksite 100, for example, when sold to a customer for delivery to an end user, the worksite 100 can include a loading area that can function as an entrance and exit to the worksite and provide access to and from highways or paved roadways 108. In various embodiments, the loading area may also be associated with railroad tracks and/or loading docks for marine vessels.

To move and transport material about the worksite 100, the worksite can be operatively associated with various types of material handling and transportation machines and devices. For example, to scoop and lift or pickup material, physically move the material between locations, and to selectively dump the material, a plurality of loading machines can be located about the worksite 100. An example of a loading machine can be a bucket loader 110 which includes a bucket 112 configured as an opened trough to receive and accommodate material. To vertically raise, lower, and tilt the bucket 112, the bucket is operatively coupled to a lift implement 114 that in turn is connected to a frame or chassis of the bucket loader 110. The lift implement 114 can be a mechanical linkage assembled from a plurality of rigid links connected by pivotal joints that can articulate and move with respect to each other to controllably displace or reposition the bucket 112. To enable the bucket loader 110 to travel short distances about the worksite 100, the frame 116 can be supported on a plurality of ground-engaging traction devices like rotatable wheels 118 rotatably joined to the frame 116.

Another example of a loading machine is an excavator 120 that can include a bucket 122 disposed at the end of another mechanical lift implement 124 that can articulate in various directions to maneuver the bucket. The lift implement 124 can be a mechanical linkage including a boom, a dipper, and a stick pivotally connected to each other. In addition to lifting and dumping material, excavators 120 can be used for digging, demolishing, and the like. Typically, the excavator 120 can be operatively supported on a plurality of ground-engaging traction devices like continuous tracks 126 through a rotatable platform 128 so that the bucket 112 and lift implement 124 can swing about a vertical axis of the excavator. Although bucket loaders 110 and excavators 120 described herein are two types of loading machines, aspects of the disclosure are applicable to other types of loading machines, and it should be appreciated the term broadly covers such machines.

To transport materials about, to, and from the worksite 100, one or more hauling machines can be used. For example, to move material within the worksite 100, an off-road hauling machine 130 or off-road truck travels about the worksite via the unpaved paths 106. Off-road hauling machines 130 can include a hauling body 132, which may be a dump body, into which material may be loaded. The off-road hauling machine 130 can be supported on a plurality of wheels 134 to propel and move about the worksite. Off-road hauling machines 130 are characterized by their ability to travel over unpaved or unfinished, often rugged, surfaces and are often configured for heavy duty or hazardous operating conditions. Another example of a hauling machine can be an on-road hauling machine 136 or on-road truck, which may also include a hauling, body 138 supported on a plurality of wheels 139. On-road hauling machines 136 are characterized by their ability for long-distance travel on paved surfaces and roadways 108 and may be configured to meet various governmental regulations for safety, operational constraints, efficiency, and the like. As described herein, the loading machines described above can be used to load material to the hauling machines.

Figure 2:
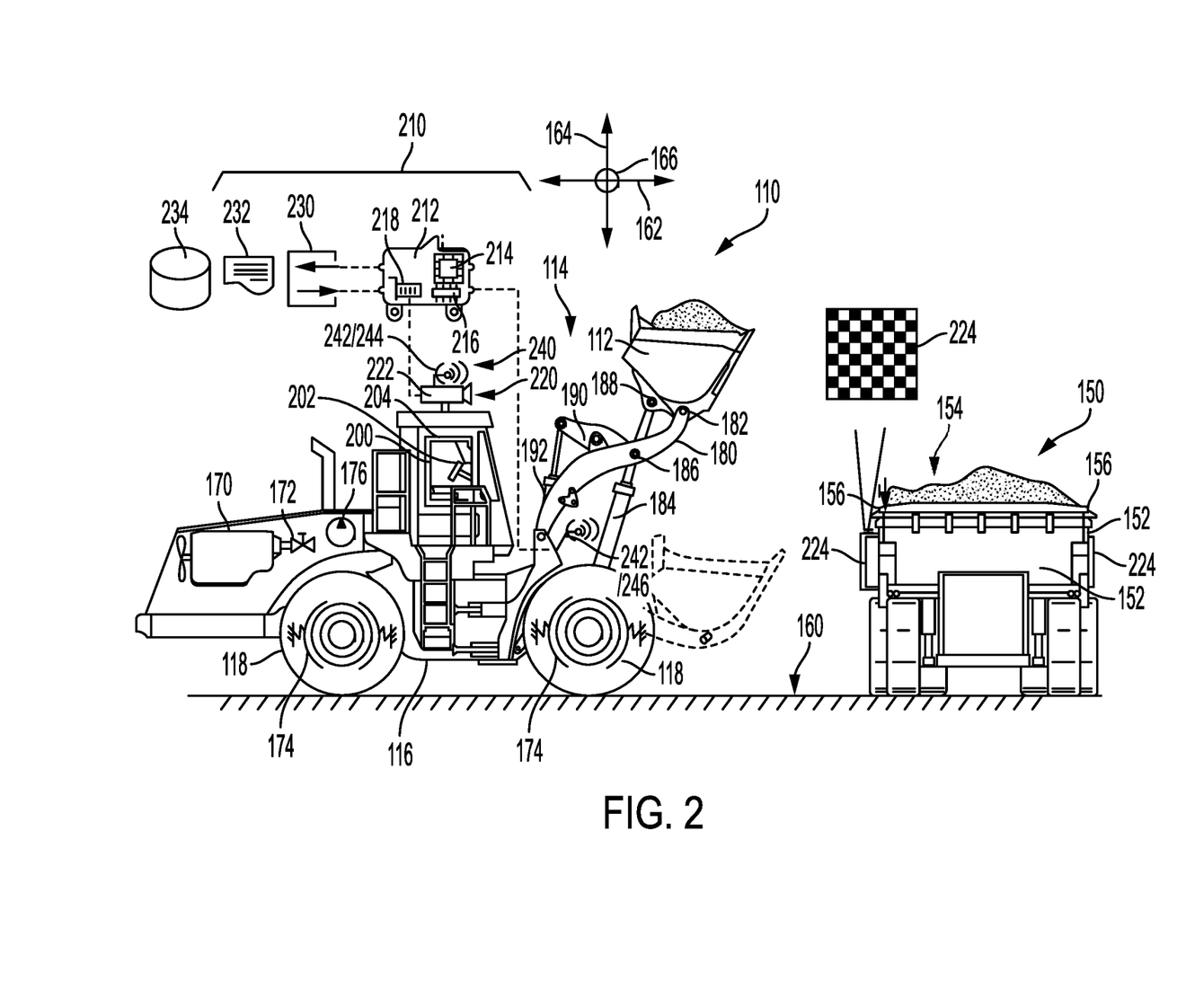
FIG. 2 is a side elevation view of a loading machine loading material to a material receptacle and associated with a perception-based alignment system in accordance with the disclosure.

For example, referring to FIG. 2, there is illustrated a loading machine, e.g., a bucket loader 110 in operative relation to a volume such as a material receptacle 150 during, for example, a loading operation. In the illustrated embodiment, the material receptacle 150 may be mobile such as the haul bodies associated with the off-road or on-road hauling machines described above. Other examples of mobile material receptacles 150 can include freight cars, cargo bays, and the like. In other embodiments, the material receptacle 150 may be of a stationary configuration and may be associated with machines and equipment different from the hauling machines. For example, the material receptacle 150 may be a hopper or the like configured to receive and gravity feed material to a crusher, conveyor, or other material handling or processing equipment. Other examples of stationary material receptacles include bins, dumpsters, and the like. In typical embodiments, however, the material receptacle 150 will delineate a volume or space that is partially enclosed by a plurality of upright sidewalls 152 that are integrally joined to define the volume. The upright sidewalls 152 may be planar structures that are oriented at right angles so that the material receptacle 150 overall has a rectangular shape; however, other shapes and configurations for the receptacle are contemplated by this disclosure. To access the enclosed volume, the material receptacle 150 is typically uncovered and provides a receptacle opening 154 to the environment at its uppermost structure. The receptacle opening 154 may be delineated by an uppermost rim, boarder, or upper edge 156 corresponding to the upper extension of the plurality of upright walls 152.

Illustrated in FIG. 2 are the spatial relations and sequence of operations of the loading task in which a loading machine, e.g., a bucket loader 110, is used to load material to the material receptacle 150. The bucket loader 110 and the material receptacle 150 can both be located on a work surface 160 or plane of the worksite, which may be paved, unpaved, indoor, outdoor, etc. The bucket loader 110 can be maneuverable with respect to the material receptacle 150, for example, by utilizing the wheels 118 to approach toward or back away from the material receptacle 150 over the work surface 160. Maneuvers toward and away from the material receptacle 150 may generally be referred to as the forward-reverse travel direction 162 (as represented by the arrow) of the bucket loader 110. In addition, to vertically raise and lower the bucket 112 with respect to the material receptacle 150, for example, to position the bucket over the receptacle opening 154 above the upright sidewalls 152, the lift implement 114 of the bucket loader 110 can vertically move up and down in the vertical direction 164, between a raised position, indicated in sold lines depicting the lift implement and bucket, and a lowered position indicated in dashed lines. When in the lowered position, the bucket 112 can be vertically proximate to the work surface 160 and can be arranged to penetrate into material for digging, or to accommodate and vertically support material for hauling or tramming over the work surface 160. In addition, to align the bucket loader 110 with respect to the material receptacle 150, the bucket loader 110 can move in a lateral direction 166 that would extend into and out of the plane of FIG. 2.

FIG. 2 illustrates the loading machine and in particular the bucket loader 110 in detail. To generate power, the bucket loader 110 can include a power source such as an internal combustion engine 170, which can burn a hydrocarbon-based fuel, or other combustible, to convert the latent chemical energy therein to a motive, mechanical power in the form of rotating motion that can be harnessed for performing work. The internal combustion engine 170 can be configured to burn any suitable fuel and may be a diesel burning compression ignition engine, a spark-ignited gasoline burning engine, a natural gas engine, a dual fuel engine or other suitable type of power source. To transfer power, the internal combustion engine 170 can be operatively associated with a rotating crankshaft protruding from the block of the engine, which is operatively coupled to the wheels 118 of the bucket loader 110 to propel the bucket loader. To control the output speed of the internal combustion engine 170, which may be measured in revolutions per minute (RPM) of the crankshaft, an accelerator or throttle 172 can be included which may adjust the quantity of air and/or fuel directed to the engine.

To selectively stop or slow motion of the bucket loader 110 with respect to the work surface 160, a brake system 174 including one or more brakes can be operatively associated with and frictionally engage the plurality of wheels 118. The brake system 174 can absorb and dissipate kinetic energy from the wheels 118 to retard motion of the bucket loader 110 with respect to the work surface 160 and, alternatively, can be released to allow motion of the bucket loader. Any suitable type of brakes can be used with the breaking system including air breaks, electrical-mechanical brakes, regenerative brakes, and the like. Other power transfer components operatively associated with the internal combustion engine 170 and wheels 118 can include clutches, transmissions, differentials, and the like. To provide power to raise and lower the bucket 112, the bucket loader 110 can include a hydraulic system 176 having a hydraulic pump operatively associated with the internal combustion engine 170 to supply pressurized hydraulic fluid through hosing, tubes or other conduits to various actuators associated with the lift implement 114.

The mechanical linkage forming the lift implement 114 can include a lift arm 180 that is pivotally connected at one end to the frame 116 of the bucket loader 110 and that is operatively coupled to the rear of the bucket 112 at the other end through a lower pin joint 182 or a revolute joint that defines a lower pivot axis of the bucket 112. A lift actuator 184 is connected to the frame 116 of the bucket loader 110 and connects to the lift arm 180 through an intermediate pin joint 186, which may also be a revolute joint. The lift actuator 184 is thus braced between the frame 116 of the bucket loader 110 and the lift arm 180 such that, when extended and retracted, the lift actuator 184 will pivotally articulate the lift arm 180 raising and lowering the bucket 112 with respect to the work surface 160 between the raised and lowered positions depicted in solid lines and dashed lines.

The bucket 112 is pivotally connected to the lift arm 180 via the pin joint 188. To rotate or tilt the bucket 112 relative to the lift implement 114, a tilt lever 190 can be rotatably coupled to the lift arm and operatively joined to the rear of the bucket at an upper pin joint 188, which defines an upper pivot axis of the bucket. A tilt actuator 192 is connected at one end to the lift arm 180 and at the other end to the tilt lever 190 to rotate the tilt lever and thereby pivot the bucket 112 about the lower pin joint 182. The bucket 112 thus rotates from a configuration vertically supporting the material accommodated therein to dump the material from the bucket to, for example, the material receptacle 150. The tilt lever 190 and tilt actuator 192 also enable the bucket 112 to tilt between the forward facing direction to penetrate and dig into material and the racked or hauling position indicated in dashed lines. The lift actuator 184 and tilt actuator 192 can be linear hydraulic cylinders that can extend and retract under the effect of pressurized fluid from the hydraulic system 176. In other embodiments, the lift implement 114 may utilize cable, pulleys, elevators or other mechanisms to raise and lower the bucket 112 with respect to the work surface 160. In an embodiment, the lower and upper pin joints 182, 188 coupling the rear of the bucket 112 to the lift implement 114 can be configured as quick coupling joints so that different styles and types of buckets can be coupled to the lift implement for different operations.

In accordance with various aspects of the disclosure, the bucket loader 110 or other loading machines may be configured for fully autonomous, semiautonomous, or manual operation. In fully autonomous operation, the machine is operated according to a predetermined work plan without the assistance of a human operator, while in semiautonomous operation, a human operator who may be present on the machine or may be at a remote location may be responsible for directing the machine to perform certain tasks which may be assisted with guidance or partial control from a control system operatively associated with the bucket loader 110. In manual operation, the operator is generally responsible for directing all tasks performed by the machine.

To accommodate an operator and/or the operator input devices or controls for manual or semiautonomous operation, the bucket loader 110 can include an onboard operator station 200 disposed in a vertically elevated location to provide a visual overview of the worksite and the bucket loader. Examples of operator input devices 202 for manual or semiautonomous operation of the bucket loader 110 can include hand wheels, joysticks, pedals, levers, knobs, keypads, etc. The operator input devices 202 can be configured for manipulative input to control operational aspects of the bucket loader 110. For example, input devices 202 can laterally turn the forward and/or rearward sets of the wheels 118 to steer the bucket loader 110. The input devices 202 can be operatively associated with the accelerator 172 to increase the travel speed of the bucket loader 110 and the brake system 174 to slow and/or stop travel of the bucket loader. The input devices 202 can be capable of adjusting and changing the forward, reverse, and neutral travel directions. To alter the position of the bucket 112, the input devices 202 can be controllably associated with the lift and tilt actuators 184, 192 to movably reconfigure the lift implement 114.

To further interface with an operator, the operator station 200 can include an interface device 204, sometimes referred to as a human-machine interface ("HMI"). The interface device 204 can be or include a visual display such as a liquid crystal display that can present visual images or textual renderings to the operator. In various embodiments, the interface device 204 can include or be associated with a graphical user interface. To receive inputs from the operator, the interface device 204 can include touchscreen capabilities or may be associated with a keypad, a mouse, buttons, switches or other inputs. In a possible embodiment, the bucket loader 110 or other type of loading machine may be configured for remote operation and the input devices 202, interface device 204, and other aspects of the operator station 200 described herein may be located off-board and remote from the machine.

In accordance with an aspect of the disclosure, the bucket loader 110 or a similar loading machine can be operatively associated with a perception-based alignment system 210 for assisting with aligning and positioning the bucket 112 relative to the material receptacle 150 during the loading operation. The perception-based alignment system 210 can be used to assist or train operators during manual and/or semiautonomous operation of the bucket loader 110, or may be used to controllably direct operation of the bucket loader during fully autonomous operation. The perception-based alignment system 210 can be implemented as a computer executable program or application utilizing instructions and data represented by programmable software code. To execute the perception-based alignment system, the bucket loader 110 can be operatively associated with an electronic controller 212, which may also be referred to as an electronic control module ("ECM") electronic control unit ("ECU"), or just a controller. The electronic controller 212 can be a programmable computing device and can include one or more microprocessors 214 for executing software instructions and processing computer readable data. Examples of suitable microprocessors include programmable logic devices such as field programmable gate arrays ("FPGA"), dedicated or customized logic devices such as application specific integrated circuits ("ASIC"), gate arrays, a complex programmable logic device, or any other suitable type of circuitry or microchip. To store application software and data for the perception-based alignment system, the electronic controller 212 can include a non-transitory computer readable and/or writeable memory 216, for example, read only memory ("ROM"), random access memory ("RAM"), EPROM memory, flash memory, or another more permanent storage medium like magnetic or optical storage. To interface and network with other operational systems on the bucket loader 110, the electronic controller 212 can include an input/output interface 218 to electronically send and receive non-transitory data and information. The input/output interface 218 can be physically embodied as data ports, serial ports, parallel ports, USB ports, jacks, and the like to communicate via conductive wires, cables, optical fibers, or other communicative bus systems. The input/output interface 218 can utilize any suitable communication protocol and, in various embodiments, may be partially implemented using wireless communication standards such as WiFi, Bluetooth, or cellular communications.

In an embodiment, to visually perceive the spatial arrangement, orientation, and positioning of the bucket loader 110 and the material receptacle 150, the perception-based alignment system 210 can include or be associated with an imaging system or a visual sensor network 220 configured to capture visual images regarding the surrounding environment associated with the bucket loader. To capture images, the visual sensor network can include one or more image sensors disposed about on the frame 116 of the bucket loader 110 that are sensitive to light or other electromagnetic radiation and can convert or process the radiation incident thereon to generate an image. For example, in an embodiment, the image sensors may be smart cameras 222 that can digitally capture the image and may include or be associated with circuitry for image processing to analyze the image and detect relational information therefrom. The smart cameras 222 can be disposed on top of the operator station 200 and at other locations to provide various fields of view and lines of sight. The smart camera 222 can capture individual stationary images or can capture continuous video and may capture images in any suitable spectrum including visual, ultraviolet, or infrared. In an embodiment, the image processing capability may be associated with the electronic controller 212 and the smart cameras 222 can be in electronic communication with the electronic controller 212 to transmit the images and associated data for further processing by the perception-based alignment system 210. The perception-based alignment system 210 may be capable of object recognition and three-dimensional spatial recognition to determine information regarding distances and orientations between objects. In another embodiment, the visual sensor network 220 can utilize other image sensors such as a reflective photosensors, a semiconductor-based device with circuitry etched in a semiconductor material to digitally pixilate the image, or a Light Detection and Ranging ("LIDAR") system instead of or in addition to the smart camera 222.

In an embodiment, to provide an image target for the visual sensor network 220, the perception-based alignment system can utilize one or more visual tags, which may be, for example, an optical fiducial marker 224. In an embodiment, the optical fiducial marker 224 can be a unique geometric pattern that is optically recognizable by the visual sensor network 220 and possibly encoding or representing information detectable by the visual sensor network 220. The optical fiducial marker 224 can have a two-dimensional (X-Y) area on which the optically recognizable pattern, image, or matrix is imprinted thereon in a machine-readable format. The optical fiducial marker 224 may be black-and-white or in color and, as depicted in FIG. 2, the pattern may consist of an arrangement of boxes, squares, rectangles, triangles, circles, lines, dots, fractals, etc. in any suitable geometric shape in a predetermined arrangement. In an embodiment, the pattern in the optical fiducial marker 224 may be three-dimensional (X-Y-Z) in shape.

The optical fiducial marker 224 can be operatively associated with the material receptacle 150 and can be located thereon in a visibly accessible area, for example, on one or more of the upright sidewalls 152. In further embodiments, a plurality of fiducial markers 224 can be included on the material receptacle 150 on different upright sidewalls 152 or different locations on the same upright sidewall 152 so that the visual sensor network 220 can detect the optical fiducial marker even when the bucket loader 110 is approaching the material receptacle 150 from various different orientations. In an embodiment, the fiducial marker 224 can be temporarily fixed to the material receptacle 150, for example, it may be a magnet attached to the upright sidewall 152 when the material receptacle checks into and enters the worksite. In other embodiments, the fiducial marker 224 can be permanently fixed to the material receptacle 150. In other embodiments, the fiducial marker 224 can indirectly associated with the material receptacle 150, for example, on another item, location, etc. that is associated with the material receptacle.

The fiducial marker 224 can provide identifying information, e.g. a unique identification number, regarding the material receptacle 150 to which it is associated with and can encode other data regarding, for example, volume, receptacle height and dimensions, etc. When imaged or scanned, the optical pattern on the fiducial marker 224 can be analyzed by the perception-based alignment system 210 to decode the information represented by the pattern and receive the information and data associated with the material receptacle 150 stored therein. Any suitable coding and decoding algorithms can be used. In a possible embodiment, the pattern of geometric shapes and spacing between different shapes can be used to visually stabilize and orientate the visual sensor network 220, for example, by providing depth perception and angular orientation through triangulation between the smart cameras 222 of the visual sensor network 220 associated with the bucket loader 110 and the fiducial markers 224 located on the material receptacle 150.

To preserve the images or the information associated with the images obtained by the visual sensor network 220 and any related information decoded or generated by the perception-based alignment system 210, the perception-based alignment system may include or be associated with a recording system 230. The recording system 230 can collect and organize the images and data as alignment data records 232 in digital format and may be associated with another medium for relatively permanent data storage 234, such as magnetic or optical memory with read/write capabilities. The recording system 230 can include archiving capabilities so that the alignment data records 232 are stored in searchable organized manner. The alignment data records 232 can be retrieved or read from the data storage 234 for reference and analysis.

In an embodiment, to supplement the visual sensor network 220, the perception-based alignment system 210 can also include a ranging system 240 including one or more ranging devices or rangefinders 242 operatively associated with the bucket loader 110 or similar loading machine. The rangefinders 242 can measure the range or distance between the bucket loader 110 and the material receptacle 150 in any suitable metric or English units. The rangefinders 242 can operate on any suitable principle or technology including laser, radar, sonic, and ultrasonic. For example, to utilize radar, the rangefinders 242 can include a first radar transmitter/receiver 244 and a second radar transmitter/receiver 246 disposed at different locations on the frame of the bucket loader 110. The first and second radar transmitter/receiver 244, 246 can transmit radiowaves toward an object and receive a portion of the signal that reflects or bounces back. Because radiowaves travel at a known and consistent speed, the time delay between transmission and reception of the radiowaves can be converted to distance and thus the range to the object can be determined.

In an embodiment, the location of the first and second radar transmitter/receiver 244, 246 on the bucket loader 110 can be selected to avoid or account for possible obstructions between the loader and the material receptacle 150. For example, the first radar transmitter/receiver 244 can be located at a vertically elevated position such as on top of the operator station 200 and the second radar transmitter/receivers 246 can be located on the frame 116 of the bucket loader 110 at a position closer to the work surface 160. The different locations for the first and second radar transmitter/receiver 244, 246 provide respective first and second lines of sight toward the material receptacle 150. A possible advantage of the present configuration is that moving the bucket 112 and the lift implement 114 between the vertically raised position and the vertically lowered position will not interfere with the ranging system 240. In particular, if the bucket 112 and lift implement 114 are raise and obstructing the first line of sight of the first radar transmitter/receiver 244 on the operator station 200, the second line of sight associated with the second radar transmitter/receiver 246 may be unobstructed. Likewise, the first line of sight of the first radar transmitter/receiver 244 may be unobstructed when the bucket 112 and lift implement 114 are vertically lower proximate the work surface 160. The perception-based alignment system 210 may be programmed or include software algorithms to recognize obstructions like the bucket 112 and lift implement 114 in the line of view of one of the first and second radar transmitter/receivers 244, 246 and utilize measurements made by the other, unobstructed radar transmitter/receiver.

INDUSTRIAL APPLICABILITY

Figure 3:
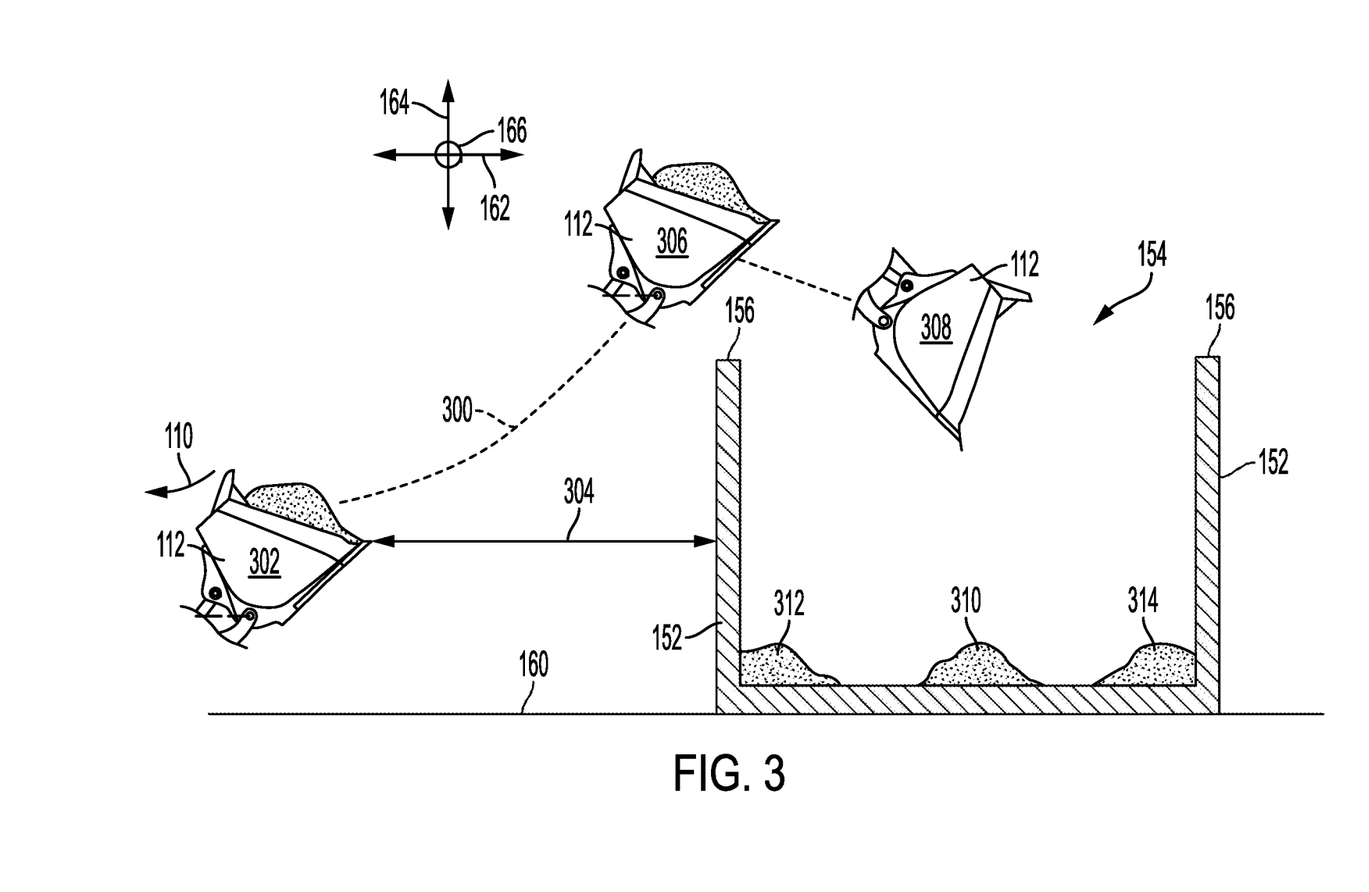
FIG. 3 is a schematic diagram of a loading operation illustrating the spatial relations between the loading machine and bucket relative to the material receptacle, including a possible sequence of maneuvers and positions associated with the loading operation.

Referring to FIG. 3, there is illustrated a possible sequence of maneuvers that may be conducted during a loading operation which involves approaching and aligning the bucket loader 110 with the material receptacle 150 while positioning the bucket 112 over the receptacle opening 154 without colliding, and doing so efficiently. In accordance with the disclosure, these maneuvers may be performed manually by an operator, semiautonomously, or fully autonomously. The bucket 112 may be guided and directed along a loading path 300 by simultaneously moving the bucket in the forward-reverse direction 162 horizontally with respect to the work surface 160 while raising and/or lowering the bucket in the vertical direction 164. The loading operation may start at an initial stage in which the bucket 112 is in a lowered positioned 302 vertically proximate to the work surface 160 and at a relative proximity 304 to the material receptacle 150. The relative proximity 304 may be characterized in part by a proximate distance in the forward-reverse direction 162 horizontally with respect to the work surface 160, however, the relative proximity 304 between the bucket 112 and the material receptacle 150 can include other directional components, distances, and angular orientation. In addition, the relative proximity 304 can be assessed or measured from another reference point, for example, with respect to the bucket loader 110 itself. However, for simplification only, the relative proximity 304 herein will be described between the bucket 112 and the material receptacle 150.

As the loading operation progresses and the bucket 112 and bucket loader 110 approach the material receptacle 150 in the forward-reverse direction 162, the bucket can be simultaneously raised in the vertical direction 164 along the loading path 300. In particular, the bucket 112 can be raised to a raised position 306 in which the bucket is positioned over and above the upper edge 156 the material receptacle 150. Vertical motion of the bucket 112 in the vertical direction 164 and horizontal motion of the bucket in the forward-reverse direction 162 can be dependent or constrained motion, meaning they occur in dependent correspondence with each other to ensure that the bucket 112 does not collide with the upright sidewall 152 of the material receptacle 150. In other words, motion of the bucket in the forward-reverse direction 162 is dependent upon or restricted by a corresponding motion in the vertical direction 164. Constrained or dependent motion ensures that the bucket 112 will be in the raised position 306 prior to reaching the material receptacle 150 in the horizontal, forward-reverse direction 162 and can vertically clear the upper edge 156 of the upright sidewall 152.

Once the bucket 112 is in the raised position 306 and clears the upper edge 156 of the upright sidewall 152, the bucket can continue to be directed and guided along the loading path 300 to be proximately disposed over the receptacle opening 154 to a dump position 308. In the dump position 308, the bucket 112 can be rotatably tilted to dump material into the material receptacle 150. In an embodiment, the material receptacle 150 may be substantially wide and it may be desirable to designate designated dump locations within the material receptacle 150 to evenly distribute material and the loading conditions from the added weight. For example, off-road hauling machines typically have wide haul bodies and uneven distribution of weight may affect the handling of the off-road hauling machine or may cause uneven wear on the suspension and related assemblies of the hauling machine. The designated dump locations may therefore correspond to center location 310 approximately in the centerline of the material receptacle 150, a near side location 312 proximate the upright sidewall 152 closest to the approaching bucket loader 110, and a far side location 314 proximate the upright sidewall 152 opposite the direction of the approaching bucket loader. To position the bucket 112 to add material to the designated dump locations (i.e. center location 310, the near side location 312, the far side location 314), the bucket 112 may be moved horizontally in forward-reverse direction 162 while in the raised position 306 within the proximity over the receptacle opening 154. The loading operation may include a repetitive series of dumps, each moving the bucket 112 along the loading path 300 until the loading operation is complete.

In accordance with the disclosure, the perception-based alignment system 210 can be configured to assist in aligning and positioning the bucket loader 110 and bucket 112 in relation to the material receptacle 150 during a loading operation such as described above. The perception-based alignment system 210 can be implemented as computer-based method, process or routine executable by, for example, the electronic controller 212 and may include a series of steps or instructions implemented as non-transitory computer executable software code in the form of an application or program. Moreover, the perception-based alignment system may include a training subroutine and an assistance subroutine.

Figure 4:
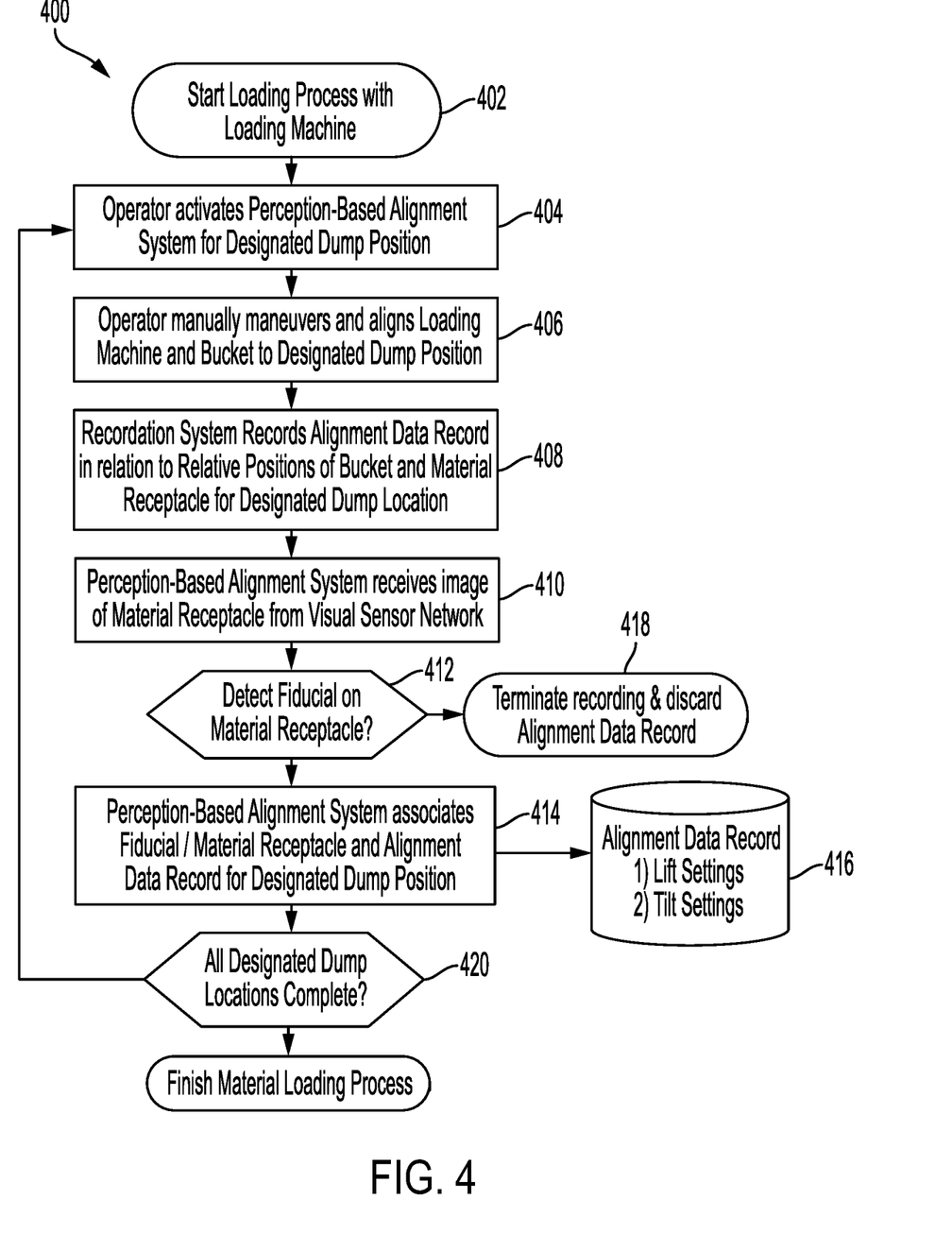
FIG. 4 is a flow diagram of a possible method for recording an alignment data record of a loading operation conducted by the loading machine.

Referring to FIG. 4 and in general reference to the previous figures, to generate an alignment data record 232 for assistance in subsequent loading operations, during the training subroutine 400 an experience operator of the loading machine, for example, a bucket loader 110, may manually align and position the bucket 112 through a sequence of maneuvers associated with the loading operation. The operator may have sufficient experience in operating the bucket loader 110 to load the material receptacles 150 and further assistance is not required. Further, the operator may be qualified to train other less experienced operators and to provide training and guidance for subsequent autonomous and semiautonomous operation of the bucket loader 110. In an initial starting step 402, the operator may begin the loading operation through manual use of the input devices 202, either from the operator station 200 onboard the bucket loader 110 or by remote access.

To generate an alignment data record 232, the operator may initiate a system activation step 404 to initiate and prepare the perception-based alignment system 210 to begin recording the tasks and maneuvers performed during the loading operation. Moreover, the operator may designate the particular loading operation with a desired dump location such as the center location 310, near side location 312, or far side location 314 explained with respect to FIG. 3. The operator may thereafter conduct a manual alignment step 406 by maneuvering, aligning and positioning the bucket loader 110 and bucket 112 relative to the material receptacle 150 to conduct the desired dump location. This may be accomplished by manually actuating the accelerator 172 and/or the braking system 174 to control movement in the forward-reverse direction 162 and manually actuating the lift actuator 184 and/or tilt actuator 192 to control movement in the vertical direction 164. Simultaneously, the recording system 230 in a recording step 408 can record the operational settings for the bucket loader 110, the bucket 112, and the lift implement 114 during the loading operation to the alignment data record 232. For example, the recording system 230 may obtain readings from various positions sensors, hydraulic pressure sensors, or other sensors associated with the lift actuator 184 and the tilt actuator 192. In an embodiment, the operational settings for the lift actuator 184 and tilt actuator 192 may be recorded for different stages of the loading operation. Moreover, as explained below, these operational settings may be associated with different relative positions between the bucket loader 110 and/or bucket 112 and the material receptacle 150. The ranging system 240 associated with the bucket loader 110 can be used to measure the relative positions of the bucket loader and material receptacle 150.

While the operator is conducting the manual alignment step 406 being recorded by the recording step 408, an imaging step 410 can be conducted where the visual sensor network 220 on the bucket loader 110 can capture an image of the material receptacle 150 and transmits the captured image to the perception-based alignment system 210 for further processing and analysis. The perception-based alignment system 210 can conduct an imaging processing step 412 using the electronic controller 212 programmed with appropriate image processing software to detect if a fiducial marker 224 is present in the captured image. For example, the perception-based alignment system 210 can perform tasks like pattern recognition and feature extraction on the captured image to discern the presence of a fiducial marker 224.

As indicated above, the fiducial marker 224 can encode or function as a unique identification that may be associated with the material receptacle 150 on which it is located. Accordingly, if the image processing step 412 detects a fiducial marker 224, the perception-based alignment system 210 can, in an association step 414, associate the alignment data record 232 either directly with the fiducial marker 224 or indirectly with the material receptacle 150. If the alignment data record 232 is associated with the fiducial marker 224, the same fiducial marker can be used on multiple material receptacles 150 of similar volume and dimension. If the fiducial marker 224 is fixed to the material receptacle 150, the fiducial marker may become a unique identifier synonymous with the material receptacle. In an embodiment, the association step 414 can associate the alignment data record 232 with both or either of the fiducial marker 224 or the material receptacle 150.

In a storage step 416, the alignment data record 232 can thereafter be stored or written to the data storage 234 associated with the recording system 230. The alignment data record 232 can reflect different settings or sequences of settings of the lift actuator 184 and tilt actuator 192 and possible other settings. If, however, the image processing step 412 fails to detect a fiducial marker 224, resulting in the absence of a unique identification linking the material receptacle 150 to the alignment data record 232, the perception-based alignment system 210 can proceed to a termination step 418 and discard the recording.

The perception-based alignment system 210 can iteratively proceed to update and record the operational settings and sequences for all designated dump locations. Accordingly, in a completion query step 420, the perception-based alignment system 210 can query if an alignment data record 232 including settings and sequences exists for all designated dump locations and, if not, may proceed to allow the operator to generate the alignment data record for additional designated dump locations by returning to the system activation step 404 for the next designated dump location. These may be updated to the alignment data record in the data storage 234. In various embodiments, the alignment data record may include all or part of a loading operation and different records may exist for various tasks or sequences of the loading operation.

Figure 5:
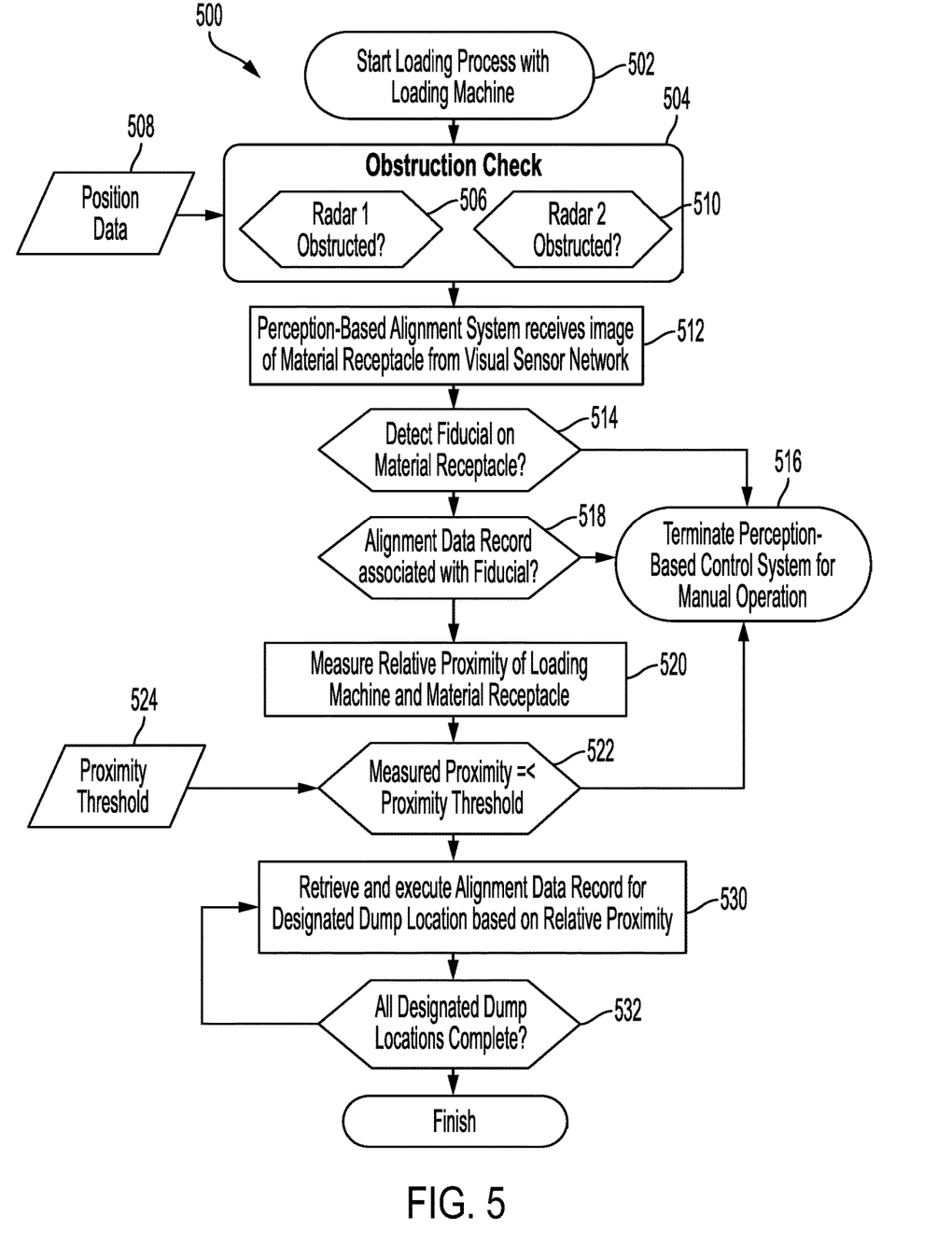
FIG. 5 is a flow diagram of a possible method to retrieve and run a previously recorded alignment data record to assist or automate a loading operation.

Referring to FIG. 5, the alignment data record 232 can thereafter be used to train lesser experienced operators or for directing the loading operation during semiautonomous and autonomous operation via the assistance subroutine 500. For example, in an initial starting step 502, the novice operator or the perception-based alignment system 210 under autonomous operation can start the loading operation to load the material receptacle 150 via the bucket loader 110. In a possible embodiment where the ranging system 240 includes multiple rangefinders described above, the perception-based alignment system 210 can run an obstruction check 504 to determine if the rangefinders are incapable of conducting measurements of the relative positions.

For example, in the obstruction check 504, a first radar query 506 may determine if the line of sight from the first radar transmitter/receiver 244 on, for example, the operator station 200 is obstructed because the bucket 112 and/or lift implement 114 are in the raised position 306. Obstruction may be determined, for example, if the measured distance to an object is so small that the object must correspond to the bucket 112 and lift implement 114. For example, there may exist an obstruction region closely associated with the first and second radar transmitter/receivers 244, 246 that, for any measurements falling within the zone, the ranging system can conclude the corresponding object must be the lift implement 114 or bucket 112. Obstruction may also be determined by, for example, enabling the ranging system 240 to receive and analyze position data 508 for the bucket 112 and the lift implement 114 to determine whether those components are in the lowered or raised position and a possible obstruction. If the first radar query 506 determines the first radar transmitter/receive 244 is obstructed, the perception-based alignment system 210 can proceed to a second radar query 510 to obtain measurements from the second radar transmitter/receiver 246 located at a lower elevation on the bucket loader 110 and can determine if the relative proximity can be measured from the second radar 246. Conversely, the obstruction check 504 may begin with the second radar transmitter/receiver 246 and proceed to the first radar transmitter/receiver 244 if a determination is made the second radar transmitter/receiver is obstructed. Because the bucket 112 and lift implement 114 cannot simultaneously be in the lowered position and the raised position, one of the first and second radar transmitter/receiver 244, 246 should obtain relative distance and positioning measurements between the bucket 112 and/or bucket loader 110 and the material receptacle 150.

Once the perception-based alignment system 210 determines which of the first and second radar transmitter/receiver 244, 246 is unobstructed, the perception-based alignment system can in an imaging step 512 use the visual sensor network 220 on the bucket loader 110 to capture an image of the material receptacle 150 as it approaches and can transmit the captured image to the perception-based alignment system 210 for further processing and analysis. The perception-based alignment system 210 can conduct an image processing step 514 using the electronic controller 212 programmed with appropriate image processing software to detect if a fiducial marker 224 is present in the captured image. For example, the perception-based alignment system 210 can perform tasks like pattern recognition and feature extraction on the captured image. If a fiducial marker 224 is not detected, and thus the material receptacle 150 is unrecognizable, the perception-based alignment system 210 can proceed to a termination step 516 and wait for further direction from the operator.

However, if the image processing step 514 does discern a fiducial marker 224 present in the captured image, the perception-based alignment system 210 can conduct a record query step 518 to determine if an alignment data record 232 is associated with the fiducial marker 224 and/or the material receptacle 150 it is identifiably associated with. The record query step 518 can be conducted using a lookup table that includes an index of fiducial markers 224 and corresponding alignment data records 232. If a corresponding alignment data record 232 does not exist, the perception-based alignment system 210 can proceed to the termination step 516 as further guidance from the system is not possible.

As described above, alignment and positioning of the bucket 112 during the loading operation may be dependent upon the relative positions (i.e. proximity) between the bucket 112 and/or bucket loader 110 and the material receptacle 150. Accordingly, in an embodiment, the perception-based alignment system 210 can utilize the ranging system 240 to measure the relative proximity in a measurement step 520 wherein the relative proximity between the bucket 112 and/or bucket loader 110 and the material receptacle 150. The measured relative proximity may include information regarding distance, position, and/or angular orientation.

In an embodiment, the ranging system 240 can also function as a collision avoidance system to avert collisions between the bucket loader 110 and the material receptacle 150. For example, in a collision avoidance step 522, the ranging system 240 can receive a proximity threshold 524 that represents a minimal proximity between the bucket 112 and/or bucket loader 110 and the material receptacle 150 for collision free operation. The collision avoidance step 522 can utilize the outcome of the obstruction check 504 to determine if either of the first and/or second radar transmitter/receivers 244, 246 are obstructed and can use the measured relative proximity obtained in the measurement step 520 from the unobstructed radar to compare with the proximity threshold 524. If the measured relative proximity is within or below the proximity threshold 524, indicating a potential collision, the perception-based alignment system 210 can proceed to the termination step 516 and possibly discontinue the loading operation and activate appropriate alarms.

If collision avoidance step 522 determines that the measured relative proximity and the proximity threshold 524 are satisfactory, the perception-based alignment system 210 can proceed to a retrieval and execution step 530 to conduct the loading operation. The retrieval and execution step 530 can retrieve the alignment data record 232 from the data storage 234 associated with the recording system and can guide the loading operation in accordance with the settings and sequences stored therein. The perception-based alignment system 210 and the alignment data record 232 can be used for either semiautonomous assistance or fully autonomous control of the loading operation.

Figure 6:
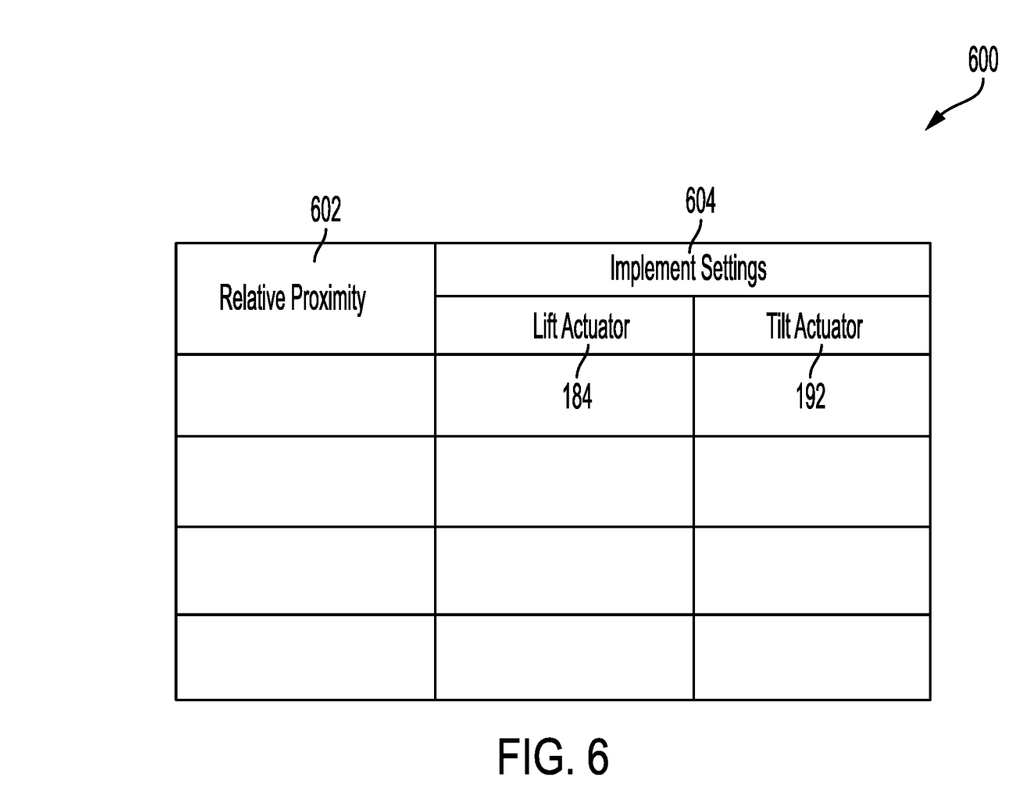
FIG. 6 is a matrix of constrained motion settings or operational settings that may be recorded as part of the alignment data record.

The alignment data record 232 can be a matrix or table indexing the constrained motion settings for operation of the lift actuator 184 and tilt actuator 192, and possibly other controllable systems on the bucket loader 110. For example, FIG. 6 illustrates a possible table 600 of constrained motion settings or operational settings based on the measured relative proximity between the bucket 112 and/or bucket loader 110 and the material receptacle 150. Values for the relative proximity 602 can be dependently related to different implement settings 604, or values for the lift actuator 184 and tilt actuator 192, which determine the position of the bucket 112 and the lift implement 114, particularly in the vertical direction 164. In converse terms, the implement settings 604 for the lift and tilt actuator 184, 192 are constrained by the values of measured relative proximity 602. The dependency or constraints can be selected to ensure the bucket 112 follows the loading path 300 in FIG. 3 and does not collide with the material receptacle 150 as the bucket loader 110 approaches in the forward-reverse direction 162. The values and setting for relative proximity 602 and implement settings 604 can be dependently related and can controllably adjust each other. In addition, multiple tables 600 can be utilized by the perception-based alignment system 210 for different operating conditions.

In the embodiment illustrated in FIG. 3, wherein the loading operation is conducted utilizing designated dump locations in the material receptacle 150 (i.e. center location 310, near side location 312, far side location 314), the perception-based alignment system 210 can conduct a completion query step 532 to assess whether material should be delivered to additional designated dump locations. If the completion query step 532 does determine additional dump locations should be completed, the perception-based alignment system 210 returns to the retrieval and execution step 530 to retrieve and execute the alignment data record 232 or portion thereof that corresponds to the next designated dump location. Accordingly, the perception-based alignment system 210 can iteratively proceed to load the material receptacle 150 at the different designated dump locations to avoid uneven distributions of material and weight in the loading receptacle.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A perception-based alignment system for aligning a loading machine with a material receptacle, the perception-based alignment system comprising: an operator input device operatively associated with a loading machine and configured to manually align and position the loading machine relative to a material receptacle and to manually actuate a lift actuator associated with a lift implement and a tilt actuator associated with a bucket;
    a recording system operatively associated with the lift actuator and the tilt actuator, the recording system being configured to record an alignment data record of operational settings for one or more of the lift actuator and the tilt actuator while manually aligning and positioning the loading machine relative to the material receptacle, the recording system being operatively associated with a data storage to store the alignment data record;
    a visual sensor network configured to capture a first imaging of a fiducial marker associated with the material receptacle; and
    an electronic controller in communication with the visual sensor network and the recording system, the electronic controller being programmed to:

associate the alignment data record with the fiducial marker on the material receptacle;

retrieve the alignment data record from the data storage upon a second imaging of the fiducial marker; and align and position the loading machine relative to the material receptacle in accordance with the alignment data record.

2. The perception-based alignment system of claim 1, wherein the step of associating the alignment data record with the fiducial marker includes associating the fiducial marker with a material receptacle identity of the material receptacle.

3. The perception-based alignment system of claim 2, wherein the visual sensor network is located on the loading machine.

4. The perception-based alignment system of claim 3, wherein the visual sensor network includes one or more of a camera, a reflective photoelectric sensor, and LiDAR.

5. The perception-based alignment system of claim 4, wherein the electronic controller aligns and positions the loading machine via semiautonomous assistance or fully autonomous control.

6. The perception-based alignment system of claim 1, wherein the electronic controller is in communication with and configured to controllably adjust one or more of the lift actuator associated with the lift implement and the tilt actuator associated with the bucket.

7. The perception-based alignment system of claim 6, wherein the alignment data record includes a plurality of constrained motion settings for one or more of the lift actuator and the tilt actuator dependent upon a relative proximity of the loading machine relative to the material receptacle.

8. The perception-based alignment system of claim 7, further comprising a ranging system to measure the relative proximity of the loading machine relative to the material receptacle.

9. The perception-based alignment system of claim 8, wherein the ranging system includes one or more rangefinders using radar location technology, laser location technology, or sonic location technology.

10. The perception-based alignment system of claim 9, wherein the ranging system include a first rangefinder in a vertically elevated position on the loading machine and a second rangefinder in a vertically lowered position on the loading machine, the vertically elevated position being higher than the vertically lowered position.

11. The perception-based alignment system of claim 1, wherein the alignment data record includes data associated with a designated dump location in the material receptacle.

12. The perception-based alignment system of claim 11, wherein the designated dump location is one of a center location, a far side location, and a near side location.

13. A method for aligning a loading machine relative to a material receptacle, the method comprising:

imaging a fiducial marker associated with a material receptacle;

recording and storing an alignment data record defining a sequence of operational settings for one or more of a lift actuator associated with a lifting implement and a tilt actuator associated with a bucket while manually aligning and positioning the loading machine relative to the material receptacle;

associating the fiducial marker on the material receptacle with the alignment data record;

imaging the fiducial marker;

retrieving the alignment data record; and aligning and positioning the loading machine relative to the material receptacle in accordance with the alignment data record.

14. The method of claim 13, wherein the step of aligning and positioning the loading machine relative to the material receptacle occurs via one of semiautonomous assistance or fully autonomous control.

15. The method of claim 14, further comprising a ranging system including one or more rangefinders to measure a relative proximity of the loading machine relative to the material receptacle.

16. The method of claim 15, wherein the alignment data record includes a plurality of constrained motion settings for one or more of the lift actuator and the tilt actuator dependent upon a relative proximity of the loading machine and the material receptacle.

17. The method of claim 16, wherein the alignment data record includes data associated with a designated dump location, the designated dump location being selected from the group comprising a center location, a far side location, and a near side location.

18. A loading machine comprising:

a frame disposed on a plurality of traction devices;

a power source operatively coupled to the plurality of traction devices to propel the loading machine;

a visual sensor network including one or more image sensors configured to capture an image of a fiducial marker associated with a material receptacle;

a recording system configured to record an alignment data record including operational setting for one or more of a lift actuator and a tilt actuator while manually aligning and positioning the loading machine relative to the material receptacle, the recording system being operatively associated with a data storage to store the alignment data record; and an electronic controller being programmed with a perception-based alignment system configured to:

associate the fiducial marker with the alignment data record;

retrieve the alignment data record from the data storage upon a second imaging of the fiducial marker; and to align and position the loading machine relative to the material receptacle in accordance with the alignment data record.

19. The loading machine of claim 18, further comprising a lifting implement associated with a lift actuator and a bucket associated with a tilt actuator, wherein the electronic controller is in communication with and controllably adjusts one or more of the lift actuator and the tilt actuator in accordance with the alignment data record.

20. The loading machine of claim 19, further comprising a ranging system including one or more rangefinders configured to measure a relative proximity of the loading machine relative to the material receptacle; wherein the alignment data record includes a plurality of constrained motion settings for the lift actuator and the tilt actuator dependent upon a relative proximity of the loading machine relative to the material receptacle.

* * * * *